(12) United States Patent
Imppola et al.

(10) Patent No.: US 9,181,103 B2
(45) Date of Patent: Nov. 10, 2015

(54) METHOD AND APPARATUS FOR IN-LINE PRODUCTION OF MILK OF LIME INTO AN IN-LINE PRODUCTION PROCESS OF PCC ARRANGED IN CONNECTION WITH A FIBROUS WEB MACHINE

(75) Inventors: Olavi Imppola, Hyvinkaa (FI); Esko Kukkamaki, Kangasala (FI); Jouni Matula, Savonlinna (FI); Paivi Solismaa, Lappeenranta (FI)

(73) Assignees: WETEND TECHNOLOGIES OY, Savonlinna (FI); UPM-KYMMENE OYJ, Helsinki (FI)

( * ) Notice: Subject to any disclaimer, the term of this patent is extended or adjusted under 35 U.S.C. 154(b) by 328 days.

(21) Appl. No.: 13/703,494

(22) PCT Filed: Jun. 9, 2011

(86) PCT No.: PCT/FI2011/050542
§ 371 (c)(1),
(2), (4) Date: Apr. 10, 2013

(87) PCT Pub. No.: WO2011/154610
PCT Pub. Date: Dec. 15, 2011

(65) Prior Publication Data
US 2013/0216468 A1    Aug. 22, 2013

(30) Foreign Application Priority Data
Jun. 11, 2010  (FI) .................................... 20105664

(51) Int. Cl.
*D21H 17/67* (2006.01)
*C01F 11/18* (2006.01)
(Continued)

(52) U.S. Cl.
CPC ................. *C01F 11/18* (2013.01); *C01F 11/02* (2013.01); *C01F 11/181* (2013.01); *C04B 2/04* (2013.01); *D21H 17/67* (2013.01); *C04B 2290/20* (2013.01)

(58) Field of Classification Search
CPC ..... D21H 17/675; D21H 17/70; D21H 17/67; D21H 17/64; C01F 11/18; C01F 11/02; C01F 11/181; C01F 11/182; C04B 18/241; C04B 2290/20; C04B 2/04
See application file for complete search history.

(56) References Cited

U.S. PATENT DOCUMENTS 1,983,572 A * 12/1934 Statham et al. ............. 162/181.2
2,147,191 A *  2/1939 Carson ......................... 423/640
(Continued)

FOREIGN PATENT DOCUMENTS

CN        1461731      12/2003
EP     0 892 019 A1     1/1999
(Continued)

OTHER PUBLICATIONS

EPO Machine translation of Japanese Office Action for related application mailed Aug. 4, 2015, 2 pages.*
(Continued)

*Primary Examiner* — Jose Fortuna
(74) *Attorney, Agent, or Firm* — Nixon & Vanderhye P.C.

(57) ABSTRACT

A method and apparatus for in-line production of milk of lime into an in-line production process of PCC arranged in connection with a fibrous web machine. In the solution, lime is slaked in a slaking apparatus at a temperature of at least 80 degrees. The produced milk of lime is cleaned by separating excessively large calcium hydroxide particles immediately prior to introducing the milk of lime into the production process of PCC. The milk of lime is introduced into the in-line production process of PCC located in the production line of the end or intermediate product of the fibrous web machine.

15 Claims, 6 Drawing Sheets

(51) Int. Cl.
*C04B 2/04* (2006.01)
*C01F 11/02* (2006.01)

(56) References Cited

U.S. PATENT DOCUMENTS

| | | | |
|---|---|---|---|
| 2,964,382 A * | 12/1960 | Hall, Jr. ........................ | 423/431 |
| 5,679,220 A * | 10/1997 | Matthew et al. ........... | 162/181.4 |
| 6,623,555 B1 * | 9/2003 | Haverinen et al. ............ | 106/465 |
| 8,852,402 B2 * | 10/2014 | Imppola et al. ............. | 162/181.2 |
| 2002/0164280 A1 | 11/2002 | Kinnen et al. | |
| 2003/0147799 A1 | 8/2003 | Spaepen | |
| 2004/0108082 A1 | 6/2004 | Hughes | |
| 2005/0089466 A1 | 4/2005 | DeGenova et al. | |
| 2006/0107872 A1* | 5/2006 | Chen .............................. | 106/470 |
| 2007/0107861 A1 | 5/2007 | Doelle et al. | |
| 2007/0131360 A1* | 6/2007 | Sipila et al. ........................ | 162/9 |
| 2013/0126116 A1* | 5/2013 | Solismaa .................... | 162/181.2 |
| 2013/0216468 A1* | 8/2013 | Imppola et al. ............... | 423/432 |

FOREIGN PATENT DOCUMENTS

| | | |
|---|---|---|
| EP | 1 160 201 A2 | 12/2001 |
| GB | 560824 | 4/1944 |
| JP | 6-73690 | 3/1994 |
| JP | 2007-522060 | 8/2007 |
| JP | 2008-501873 | 1/2008 |
| JP | 2009-103854 | 5/2009 |
| JP | 2010-254490 | 1/2010 |
| WO | 99/51525 A1 | 10/1999 |
| WO | 01/77020 A1 | 10/2001 |
| WO | 2005/033403 A1 | 4/2005 |
| WO | 2005/061386 A1 | 7/2005 |
| WO | 2009/056178 A1 | 5/2009 |
| WO | WO 2009083633 A1 * | 7/2009 |
| WO | 2009/103854 A2 | 8/2009 |
| WO | 2010/055199 A1 | 5/2010 |
| WO | WO 2011154610 A1 * | 12/2011 |

OTHER PUBLICATIONS

European Search Report mailed Sep. 15, 2011.

Japanese Office Action for related application mailed Aug. 4, 2015, 2 pages.

* cited by examiner

METHOD AND APPARATUS FOR IN-LINE PRODUCTION OF MILK OF LIME INTO AN IN-LINE PRODUCTION PROCESS OF PCC ARRANGED IN CONNECTION WITH A FIBROUS WEB MACHINE

The present invention relates to a method and apparatus for producing milk of lime into the in-line production process of PCC arranged in connection with a fibrous web machine. Especially advantageously the method and apparatus according to a preferred embodiment of the invention relate to the production of milk of lime by slaking quick lime.

Slaking of quick lime means production of calcium hydroxide (slaked lime, milk of lime) from calcium oxide (burnt lime). In paper industry the slaking of quick lime is usually done in connection with the production of calcium carbonate used as a filler or coating material of paper. Traditionally quick lime is slaked by making an aqueous slurry with certain proportions of powdered burnt lime (CaO) acting as initial material and produced by heating calcium carbonate/limestone. Traditionally this is done by dosing calcium oxide and water into a large slaking tank and the mixture is mixed by means of a large mixer. In the process, as the calcium oxide reacts with water, it is converted to calcium hydroxide ($Ca(OH)_2$). Simultaneously heat is released. The coarse, unreacted fraction is separated from the produced calcium hydroxide slurry by means of e.g. settling/clarifying, the fraction being transported via a washer screw to a transport container and further for use in soil conditioning in e.g. agriculture. The screened calcium hydroxide, also called milk of lime, is then pumped to a storage vessel and transported therefrom for further use, such as for production of precipitated calcium carbonate (PCC).

Finnish patent FI 103964 (FIG. 1) describes a different type of slaking method of quick lime, in which the mixed slaking tank mentioned in the above-mentioned production method is replaced by a combination of an impact mill disintegrator and a slaking/separation tank. In the process described in the patent, calcium oxide and an excess of water is directed to the impact mill disintegrator The material discharged from the impact mill disintegrator, i.e. the aqueous suspension containing calcium hydroxide is retained in the vessel for several tens of minutes with the purpose of both entirely slaking the quick lime and allowing impurities to settle from the suspension. The settling fraction contains oversize particles from the excessively burned calcium oxide as well as other impurities, of which sand and silicates can be especially mentioned. All these oversize particles are returned to the impact disintegrator, in which they are again reduced in size, until all of the material is uniformly sufficiently fine. The more or less clean calcium hydroxide from the settling process, the calcium hydroxide also containing fine impurities that have been forcefully comminuted, is taken into a storage vessel to wait for further use, such as production of calcium carbonate.

The solution described in the patent has for example the following problems. As an excess of water has been directed into the impact disintegrator, the comminuting of calcium carbonate is impaired due to the dampening and lubricating effect of water. At the same time also a remarkable portion of the heat produced in the slaking of quick lime is used to heat the excess water which means that the heat cannot be utilized in the best possible way to accelerate the quick lime slaking process. Further, the storing of the milk of lime waiting for further use results in the growth of calcium hydroxide agglomerates which naturally degrades the quality of the milk of lime.

FI patent 120733 (FIG. 2) describes a method further developed from the previous patent for producing finely comminuted calcium hydroxide by means of an impact disintegrator, whereby the calcium oxide is disintegrated in the impact disintegrator, into which a small amount of water is directed for moistening the formed particles and binding the dust. The calcium oxide powder formed and moistened in the impact disintegrator is directed into a screw conveyor arranged in connection with the impact disintegrator and acting as a pre-slaker, into which water is added and where the material is subjected to a rubbing effect. From the screw the material, now a mixture of calcium oxide and calcium hydroxide, is taken to a tank acting as a post-slaker, into which the rest of the total water volume needed for the slaking is added. The amount of water added to the impact disintegrator and the pre-slaker is about 20 to 50 percent of the necessary total amount of slaking water, preferably about ⅓ of the total amount of slaking water, and the amount of water added to the post-slaker is 80 to 50 percent of the total amount of slaking water, preferably about ⅔ of the total amount of slaking water. After slaking, coarse impurities, such as humus, iron, sand, silicates and non-comminuted calcium oxide particles, are removed from the milk of lime by settling, which may take from tens of minutes to even hours, the impurities being finally removed from the process. Finally the formed milk of lime can either be taken to a storage tank or directly to the production of calcium carbonate.

In both the publications mentioned above the final slaking of the quick lime is carried out in a tank provided with mixing and requiring a relatively large size. Further, both the publications suggest performing the cleaning of the milk of lime by settling which presupposes a large tank. The slaking tank and the settling tank may in some situations be one and the same tank. When the milk of lime is cleaned in the slaking tank, it is possible that quick lime drifts from the slaking tank to use which by no means is desirable. The slaking and the cleaning of milk of lime of the type described above are not suitable, for example because of their space requirements, for the in-line PCC production process of the present invention.

Publications WO 2005/033403 and WO 2005/061386 disclose how slaked lime may be cleaned for example in a screen, a fine screen, a centrifuge or a cyclone separator. The publications mentioned, however, do not pay any attention to how the slaking of quick lime is performed in practice.

When calcium hydroxide produced by any of the above-mentioned methods or any other conventional method is the starting point for the production of precipitated calcium carbonate, i.e. PCC, carbon dioxide is needed as the second chemical of the process. This can be acquired either as pure carbon dioxide or it can be recovered from a plant producing flue gases near the production point of PCC. It is, for example, possible to take from the stack of a near-by power plant or industrial plant flue gases with a carbon dioxide content of about 5 to 15 percent into the carbon dioxide production process. Before the carbon dioxide obtained from the flue gas can be taken to the PCC production reactor, the flue gas must be cleaned and cooled in a flue gas scrubber. During washing the solid particles present in the gas are washed into the water. The cleaned and cooled flue gas can subsequently be directed in a prior art way to a PCC precipitation reactor filled with calcium hydroxide, in which the carbon dioxide contained therein causes under a powerful mixing the calcium hydroxide to precipitate into calcium carbonate ($Ca(OH)_2 + CO_2 > CaCO_3 + H_2O$). Excess flue gas is discharged into the atmosphere via discharge tubes. The prepared calcium carbonate slurry is stored in tanks from which it is further pumped or delivered with tank trucks to customers.

Prior art (e.g. WO-A2-2005/044728) also describes a method of producing PCC directly into the fibrous pulp in the approach system of the fibrous web machine. In another prior art publication the precipitation of PCC, i.e. the crystallization of calcium carbonate among the fibers, is said to take even minutes or at least tens of seconds. According to prior art it seems obvious that the crystallization of PCC takes so long because its conventional production in a precipitation reactor separate from the paper machine similarly takes at least minutes. In most cases the conventional production of PCC takes place in a batch-type reactor. The reason for the long duration of the crystallization was considered to be the weak mixing, because if the milk of lime and carbon dioxide are not properly and evenly in contact with each other, it is obvious that the crystallization reaction takes a long time.

In publication WO-A2-2009103854 the idea was to improve expressly the mixing of the initial materials of PCC by utilizing an injection mixer for the mixing of milk of lime and/or carbon dioxide, by means of which the chemicals could be mixed into the fiber suspension in a fraction of a second. The purpose of the solution according to the publication was to be able to accomplish the crystallization reaction of PCC as fast as possible, in about one second or even in a time clearly shorter than this. When studying the crystallization of PCC after the fast and efficient mixing taught in the publication, two observations were made. First, there still were quite large size deviations in the size distribution of the PCC-crystals. In this stage it was realized that the size distribution of the PCC crystals must to a large degree depend on, in addition to the speed of the crystallization reaction, also on the particle size of the milk of lime. It was at the same time observed that the crystallization reaction still requires a relatively long reaction time, which means a relatively long reaction zone in the approach system of the fibrous web machine despite the fact that the actual mixing of chemicals (milk of lime and carbon dioxide) takes place very quickly and at a very short distance. In other words, the faster the desired crystallization reaction of PCC is (meaning in practice both PCC with constant size as well as a short reaction zone), the better the particle size of the milk of lime must be controlled. In practice the crystallization of calcium carbonate proceeds very quickly when using the method of the above-mentioned patent application, but when all the fine-particled milk of lime has been consumed, the dissolution of the remaining larger calcium hydroxide particles takes an unproportional amount of time when compared with the fast initial crystallization reaction. Thus, a problem to be solved by means of the invention is to decide what to do with the larger particles present, for some reason, in the milk of lime or how to avoid their formation in the milk of lime.

SUMMARY OF INVENTION

There are two solutions. First, the aim can be to produce milk of lime with such a small particle size that it dissolves and crystallizes to calcium carbonate quickly, i.e. in such a time that it is easy to provide the approach system of the fibrous web machine with a reaction zone of suitable length. The other method is to clean the milk of lime so that only particles of desired size, i.e. sufficiently small, are taken into the production process of PCC.

In the tests we have performed we have learned that it is possible to influence the particle size of the milk of lime during both the production of the milk of lime as well as during later processing of the milk of lime. The previously mentioned publication FI-120733 discusses a method of producing fine-particled calcium hydroxide. The methods for achieving a fine-particled calcium hydroxide disclosed in the patent are comminuting the quick lime before slaking and shortening the slaking time. It is, however, questionable how small a particle size can be achieved, when the final slaking of lime is done according to the patent in a post-slaker, in which the milk of lime is kept in a mixed tank for over three minutes. The publication does not discuss the possibilities provided by temperature for reducing the particle size of the milk of lime as observed in our tests.

In our tests we noticed that, in addition to having an effect on the particle size of the produced milk of lime by means of slaking time and temperature of lime, the delays arising in various stages of the production and treatment process of milk of lime have a considerable effect on the particle size of milk of lime, so that said delays thus cause problems in the production of both milk of lime and PCC. The calcium hydroxide particles in the milk of lime do namely have a tendency to form agglomerates, i.e. solid particles of calcium hydroxide, as soon as the milk of lime has to stay a while before further use. When these particles end up in the production of PCC they slow the material transfer, because the calcium hydroxide naturally starts to dissolve beginning from the surface of the particle during the production reaction of PCC. The larger these particles are, i.e. the longer the milk of lime has been stored or merely retained during settling before use, the longer it takes for the particles to dissolve and the longer the reactor contains calcium hydroxide that reacts with carbon dioxide. This, in turn, means increase of crystal size deviation in the produced PCC, because in the production of PCC both formation of new crystals and size increase of the existing crystals takes place for as long as there are both initial chemicals present. The above-described situation is present always when there are particles of different sizes in the milk of lime, thus also in the process applying the method of the previously mentioned WO-A2-2009103854. However, if PCC is produced in a separate plant, it is possible to process the PCC by means of, e.g. a cyclone separator prior to mixing it with the fibrous pulp, whereby it is possible to introduce PCC crystals of desired size into the fibers. Such a method is not, however, possible when the PCC is produced directly in the approach system of a fibrous web machine (the so-called in-line method) as described in e.g. WO-A2-2009103854.

In other words, in order to get the crystallization of PCC into even-sized particles to operate optimally, the production and processing of milk of lime must be developed to be on the level of other processes and apparatuses relating to the production of PCC.

In this stage it can be stated that prior art lime slaking solutions usually include almost as a rule separation of impurities from the milk of lime either by settling or by mechanically screening. For example, WO-A2-2005/044728 discusses screening the milk of lime. However, the purpose of the settling or screening is only to remove waste rock or other such impurities, because the screening or settling is carried out immediately after the slaking and because the milk of lime is taken to an intermediate or storage tank after screening and settling. In other words, the agglomeration tendencies of milk of lime have not been recognized in prior art publications.

Thus, one concrete problem of the above-mentioned prior art processes is that the particle size of the milk of lime deviates too much. Reasons for this can be found in either slaking of the lime or in the processing of the milk of lime subsequent to slaking. Quick lime can easily be slaked so that the size of the calcium hydroxide particles formed in the milk of lime is allowed to deviate relatively much, but still so that even the largest calcium hydroxide particles are not separated in the sorting subsequent to slaking. On the other hand, in the further processing of milk of lime before the production of PCC, there are unnecessary delays that reduce either the quality or yield of the actual product or reduce the quality of the intermediate or final product. Possible causes of delays include, among others:

separating impurities from milk of lime by settling, which requires a considerably long settling time (mostly hours) in order to operate efficiently, storing the milk of lime prior to taking it to the application, and transporting/transferring the milk of lime to the application, all of which have the forming of solid calcium hydroxide particles as a result.

In addition to this, following problems can be noticed in some prior art processes relating to the production of milk of lime or PCC, the problems being partly caused by the above mentioned delays:

forcefully grinding the waste rock or other inapplicable product in the lime slaking process, whereby e.g. the waste rock ending up in the final product reduces the whiteness of the product, Use of milk of lime having solid particles for the production of PCC reduces the quality of PCC and thus the quality of the end product, Sorting milk of lime having solid particles prior to production of PCC leads to rejecting and removing the solid particles from the process, which in practice results in a smaller yield of lime.

Sometimes quick lime is also screened either before the conventional slaking in a tank or subsequent to it, whereby the limestone particles therein end up in reject and are removed from the process.

The above-mentioned problems relating to both the particle size of the milk of lime as well as its particle-forming are emphasized in modern in-line production of PCC in which the calcium carbonate is crystallized directly into the approach system of the fibrous web machine. In other words, currently the aim is to precipitate the calcium carbonate directly among the fibrous stock, preferably directly onto the surface of the fibers, whereby forming of PCC particles having a correct size is of primary importance. Because in such a system the aim is to complete the precipitation of PCC in a very short time, mainly to produce crystals of constant size, the particle size of the milk of lime used as raw material is of much more essential importance to the quality of the final product than previously.

Thus, the purpose of the invention is to raise the state of the art of the industry by proposing such a method and apparatus for in-line production of milk of lime into an in-line production process of PCC arranged in connection with a fibrous web machine, the method and apparatus minimizing problems and disadvantages of prior art.

An object of the invention is to provide such a method and apparatus for in-line production of milk of lime into the production process of PCC arranged in connection with the fibrous web machine, the method and apparatus operating efficiently and reliably and that uses as efficiently as possible the available raw materials, water and energy.

Another object of the invention is to control the agglomeration of calcium hydroxide either so that it does not take place at all or so that its disadvantage to the process is as little as possible.

A third object of the invention is to provide a method for in-line production of milk of lime into the in-line production process of PCC arranged in connection with a fibrous web machine, the method being utilized when producing precipitated calcium carbonate into the approach pipeline of the headbox of the fibrous web machine subsequent to the production of milk of lime in an efficient and simple way.

The above-mentioned and other objects of the invention are mainly achieved as disclosed in independent claims 1 and 17.

The other additional characteristic features of the invention will become apparent from the appended dependent claims and the following description of the embodiments of the invention illustrated in the figures.

The main advantages of the invention are listed in the following:

Efficient production method of milk of lime, the method saving energy, fresh water and raw material, Efficient post-processing of milk of lime prior to production of PCC, and Efficient production of PCC, optimized for the end product.

SUMMARY OF FIGURES

In the following the invention and its operation are described by reference to the appended schematic drawings, in which.

DESCRIPTION OF EMBODIMENTS(S) DISCLOSED IN FIGURES

Figure 1:
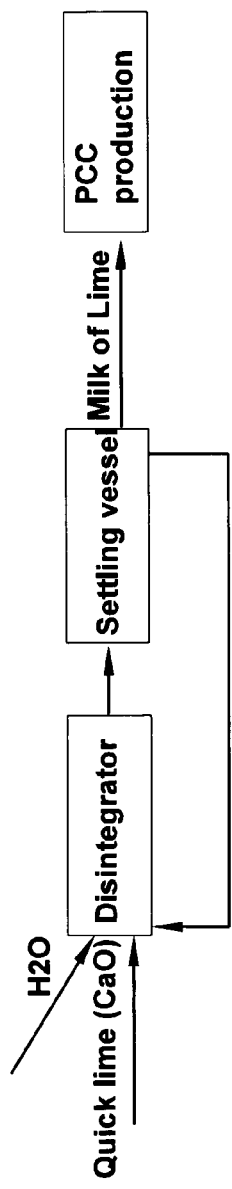
FIG. 1 is a schematic illustration of a prior art method of producing milk of lime and, further, PCC.
Figure 2:
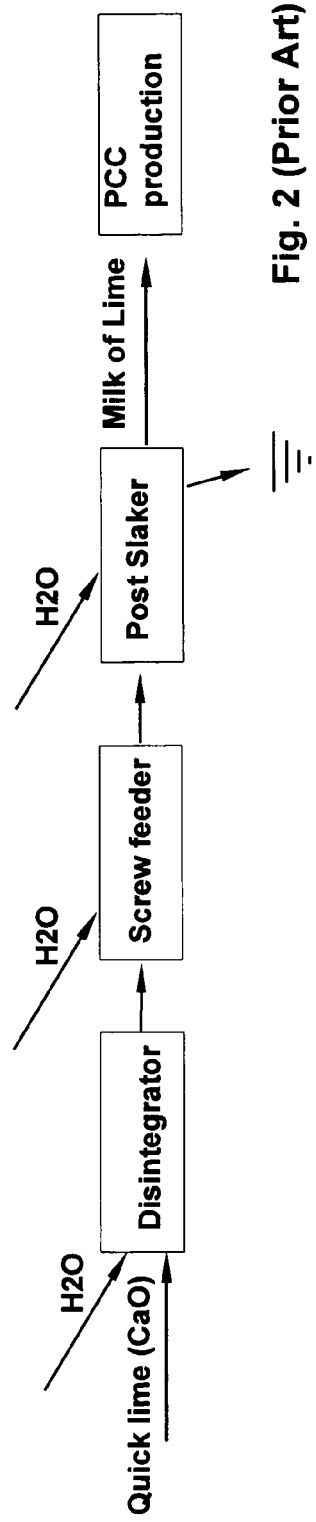
FIG. 2 is a schematic illustration of another prior art method of producing milk of lime and, further, PCC.

The prior art publications FI-B1-103964 and FI-B1-120733 discussed already above in detail and with reference to the schematical FIGS. 1 and 2 mainly present different methods of producing fine-particled milk of lime. Both publications teach separation of coarse impurities from the milk of lime by settling. These publications merely state that milk of lime is used for the production of precipitated calcium carbonate, i.e. PCC. Neither of the publications actually discusses how PCC is actually produced. Further, the production method of milk of lime described in the publication involves certain weaknesses, which this invention tries to correct.

Figure 3:
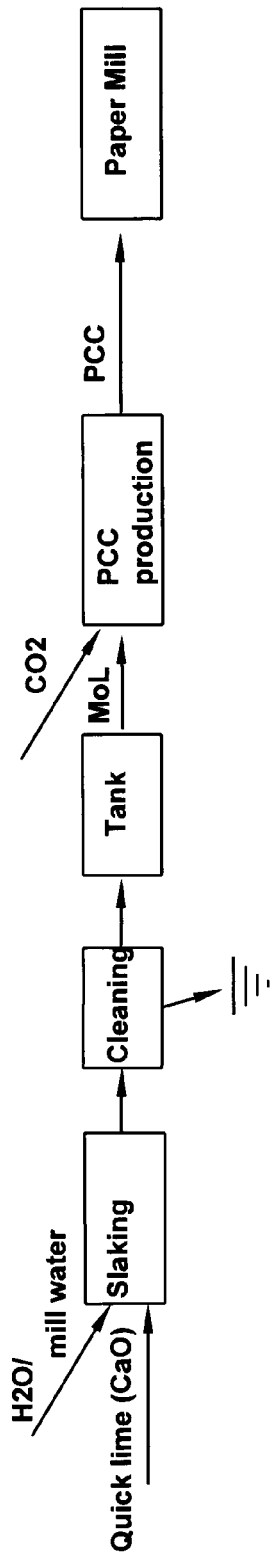
FIG. 3 is a schematic illustration of a third prior art method of producing milk of lime and, further, PCC.

FIG. 3 is a very schematical illustration of a conventional method of producing PCC. The production takes place in a dedicated PCC plant, in which the milk of lime is produced by first slaking quick lime in e.g. a mixed slaking tank, subsequent to which the slaked calcium hydroxide suspension, milk of lime, is sorted by e.g. settling for removing large particles. After sorting, the milk of lime (MoL) is introduced mostly via an intermediate/storage tank to a PCC reactor, into which also the other ingredient of PCC, carbon dioxide, is introduced, wherefrom the produced PCC is transported after a possible intermediate storage to the paper machine either by pumping it via the pipelines or with tank trucks to fibrous web machines located farther away.

Figure 4:
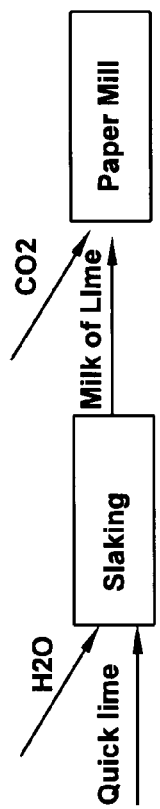
FIG. 4 is a schematic illustration of a fourth prior art method of producing milk of lime and, further, PCC.

FIG. 4 is a very schematical illustration of a more modern method of producing PCC, disclosed in WO-A2-2009103854. Here the ingredients of PCC, milk of lime produced from quick lime by slaking and carbon dioxide, are introduced into the approach system of a fibrous web machine, in which the actual crystallization reaction of PCC preferably, but not necessarily, takes place in the presence of fibers of the paper pulp or other solids of the paper pulp.

As has previously been stated, none of the milk of lime production or processing solutions aiming towards the production of PCC, have considered the tendency of milk of lime to form agglomerates. Thus, neither the ways to prevent the formation of agglomerates nor their removal have been discussed. The agglomerates are, however, removed for a while in case the method used for sorting the milk of lime, for example the hole size of the screen, is suitable for this purpose as well. In most cases, however, the prior art processes subsequent to sorting include some kind of storage or at least a transport stage of relatively long duration, during which agglomerates can be formed again.

Figure 5:
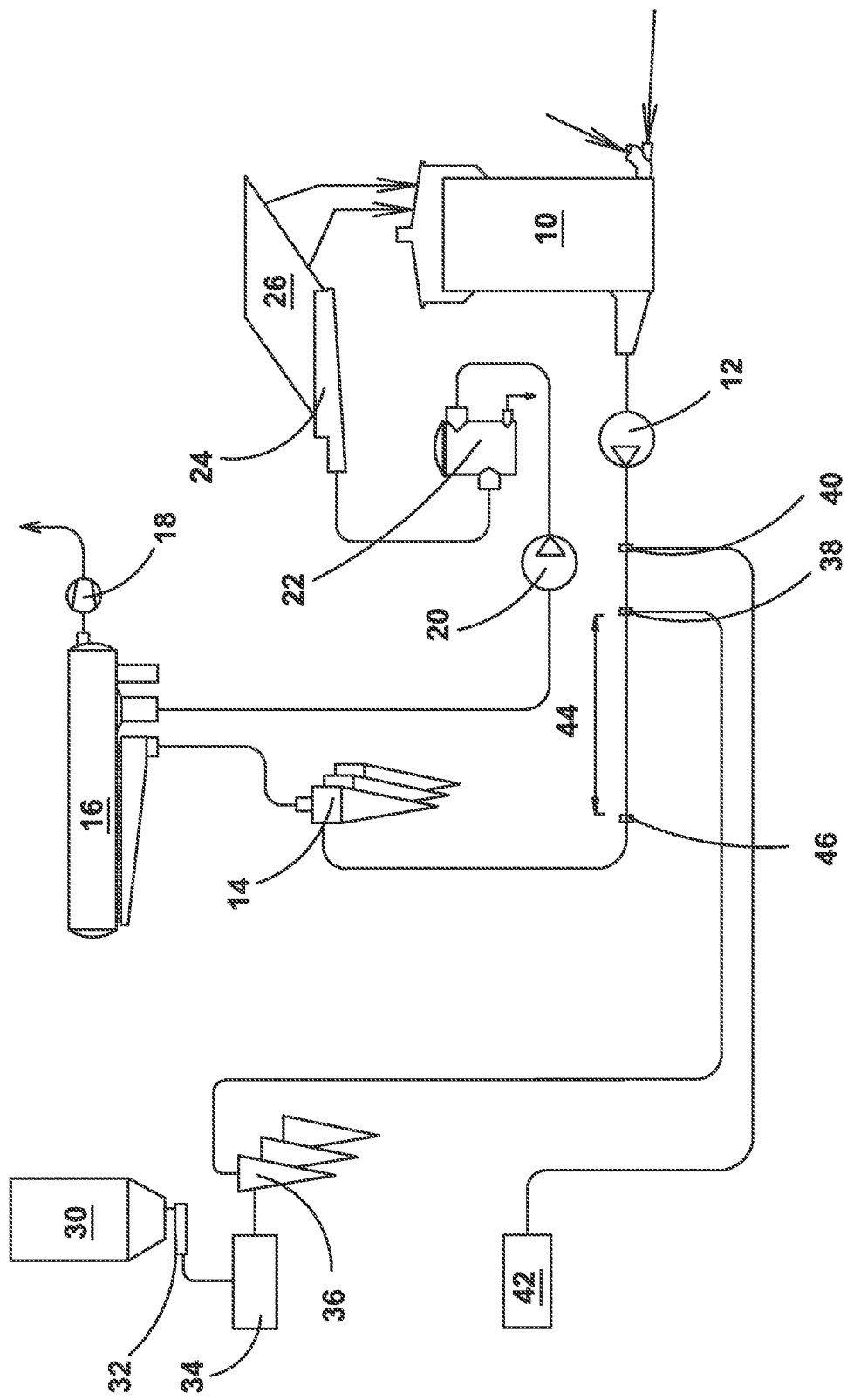
FIG. 5 is a more detailed illustration of the method schematically shown in FIG. 4 for producing milk of lime and PCC connected to the short circulation of the paper machine.

FIG. 5 is a schematical illustration of yet another prior art milk of lime production solution, combined with the production of PCC in a relatively conventional headbox approach system shown very schematically and briefly in FIG. 4. The approach system of the fibrous web machine comprises a wire water tank/mixing tank 10 into which the filtrate from both the wire part of the fibrous web machine and the various fiber components and possible also the filler materials and additives used in the production of the fibrous web product are introduced. From the mixing tank 10 the fibrous suspension is pumped by means of a pump 12 most usually to a cyclone cleaning plant 14, in which heavy impurities are removed from the fibrous suspension which impurities would otherwise be detrimental to the production of the end product. Then the fibrous suspension is taken into a gas separation tank 16, in which gas, mostly air, is separated from the suspension by means of a vacuum pump 18 which gas would be detrimental to the production of the end product should it end up on the wire section. From the gas separation tank 16 the fibrous suspension flows to the headbox feed pump 20 pumping the fibrous suspension via a headbox screen 22 to the headbox 24 of the fibrous web machine. It should be remembered already in this stage that one or more of the above-mentioned cyclone cleaning plant, gas separator and headbox screen may in some fibrous web machines be left out from the approach system. The headbox 24 spreads the pulp onto the wire section 26 of the fibrous web machine, the wire in this figure being shown as a fourdrinier wire. The arrows under the fourdrinier wire section 26 show that the filtrate from the wire section is usually directed into the wire water tank, which is here arranged in connection with the mixing tank 10.

The fully prior art approach system of a headbox of a fibrous web machine described above is as an example provided with a quick lime slaking apparatus connected therewith, the apparatus consisting of a hopper 30 containing burnt lime, a conveyor/feed screw 32 and a slaking tank 34, in which the quick lime is slaked in a way in principle known from prior art. The calcium hydroxide, i.e. milk of lime produced in the slaking tank 34 is introduced either as diluted or undiluted, depending on the amount of water used in the slaking tank 34, to cleaning 36 (here shown as one or more cyclone separator), in which undesirable impurities, such as humus, iron, sand, silicates and uncomminuted calcium oxide particles are separated from the milk of lime and they are removed from the process as reject of the cyclone separator/s. The accept of the cyclone separator/s, i.e. clean milk of lime, is transported in the embodiment shown in FIG. 5 directly without intermediate storage to the pipeline of the approach system of the paper machine, preferably to point 38 between the pump 12 and the cyclone cleaning apparatus 14 for producing precipitated calcium carbonate (PCC) directly into the short circulation of the fibrous web machine. The cleaning plant 36 or cleaning stage can be considered being located directly before the reaction zone 44 of the production of PCC, because the distance from the cleaning 36 to production of PCC, more specifically to the introduction point 38 of milk of lime, should be such that there is not enough time for forming solid particles/agglomeration of calcium hydroxide in a disadvantageous amount. This means that the particle size of the milk of lime stays below 1.2 µm, measured with the Sedi-Graph-method based on sedimentation technology, preferably below 1.0 µm and/or the flow time from the cleaning to the mixing stage of the production of PCC is preferably less than 30 seconds, most preferably less than 10 seconds. At this stage it should however be considered that due to process technological reasons there usually must be a buffer tank in the system into which milk of lime is stored in case of any disturbances during the slaking. In other words, a small portion of the cleaned milk of lime is directed as a continuous flow into the buffer tank wherefrom a corresponding flow of milk of lime stored for a while is also exhausted to the production process of PCC. In other words, when talking about directing the milk of lime from the cleaning directly to the production of PCC, what is meant is that the most of the cleaned milk of lime is taken directly into the production process of PCC. Similarly, in the same pipeline of the approach system slightly upstream of the milk of lime feed point 38, carbon dioxide is introduced at point 40 from source 42, that can be, for example, a pressure tank containing carbon dioxide or a flue gas cleaning apparatus, in which the flue gas of the plant is cleaned so as to be suitable for the production of PCC. Differing from what is shown in FIG. 5 the carbon dioxide can be, when desired, introduced downstream of the milk of lime feed point into the pipe leading to the headbox. In addition to the above-mentioned certain points 38 and 40 of the pipeline the milk of lime and/or carbon dioxide can be introduced into other points of the fibrous web machine approach system to between the apparatuses located in the pipeline and/or to the actual apparatuses, i.e. the mixer, pump, mixing tank, wire pit and so on, to name a few possibilities. In addition to the chemical feed points described above in more detail the in-line production of milk of lime may be provided in connection with any suitable liquid flow of the production line of an end product or an intermediate product of a paper, board or pulp mill into which liquid flow PCC is produced in-line. In this case the possibilities are mainly various pulp components, filler material components, processed or unprocessed filtrates from paper, board and pulp mills (including both chemical, mechanical and recycled pulp), just to mention a few examples.

Figure 6:
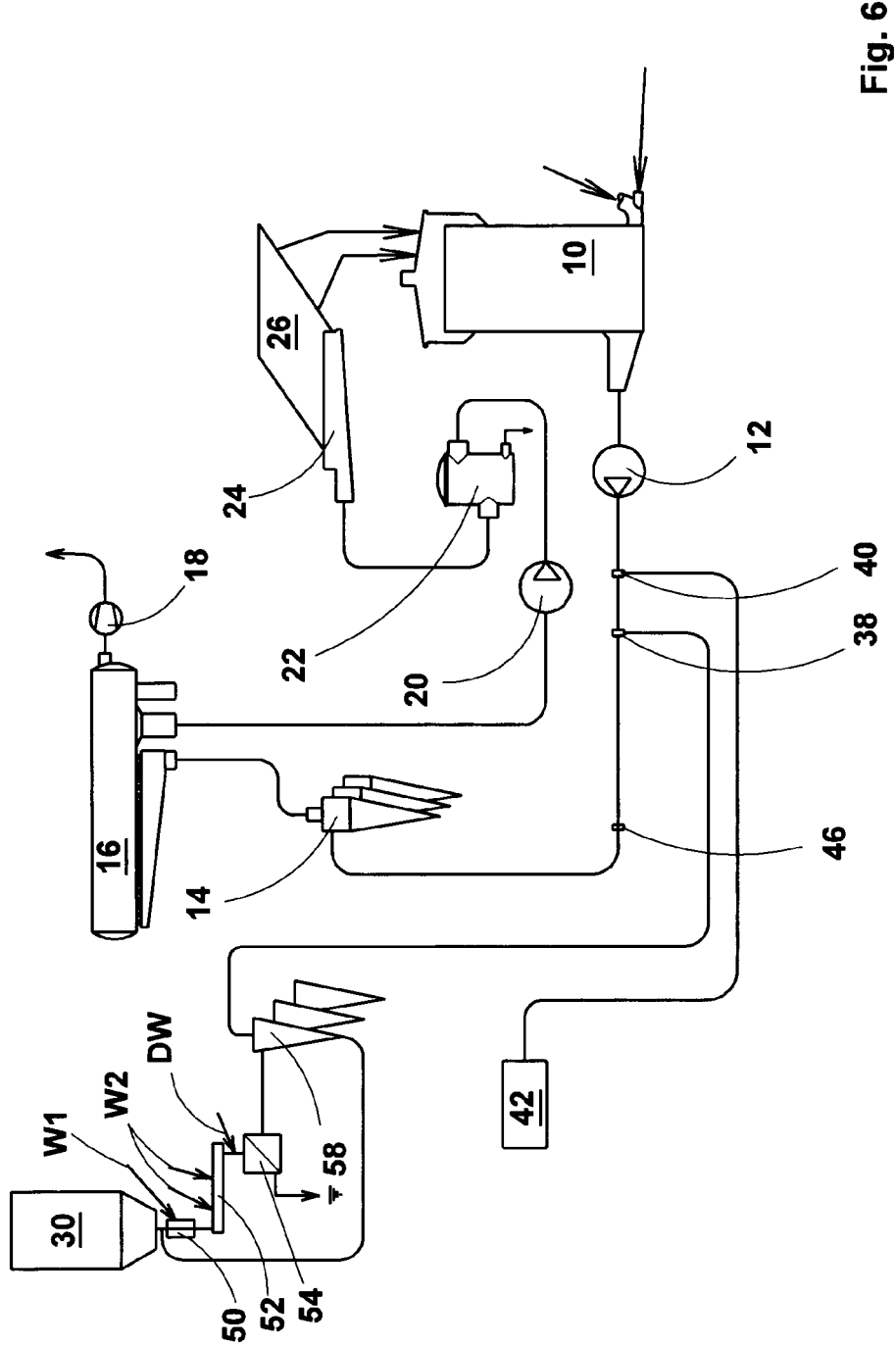
FIG. 6 is a schematic illustration of an apparatus according to an advantageous embodiment of the present invention for in-line production of both milk of lime and PCC.

The lime slaking apparatus shown in FIG. 5 above may according to the first preferable embodiment of the present invention be replaced by the considerably faster apparatus shown in FIG. 6, the apparatus comprising a rotating mixing or comminuting apparatus 50 forming the first part of the slaking apparatus and creating large shearing forces, located subsequent to the quick lime hopper 30 and replacing the slaking tank of FIG. 5. A characterizing feature of the comminuting apparatus 50 of this embodiment is that the apparatus comprises two parts rotating fast in relation to each other, the parts exerting large shearing forces into the processed material The parts may be a rotating rotor and a non-rotating stator, but it is of course also possible to use two contra-rotating rotors. The impact disintegrator described in FI patent 120733 may be mentioned as an example of the comminuting apparatus, even though there are a number of other alternatives as well. The comminuting of the quick lime with the comminuting apparatus 50 may in principle be performed in three ways either as completely dry by dosing some slaking water to the quick lime to be comminuted, or by dosing the whole water volume required in the slaking to the quick lime to be comminuted. Then the quick lime comminuted by comminuting apparatus 50 either in the presence of slaking liquid (optional feed of slaking liquid shown with arrow W1) or dry is discharged from the apparatus 50 to the slaking apparatus, in this embodiment advantageously a screw 52.

It is characteristic of the most preferred embodiment of the present invention that the amount of water is fed into the comminuting apparatus 50 which fastest raises the temperature in the slaking reaction of quick lime. In practise this means a water amount which has time to start the slaking process in the comminuting apparatus and is essentially fully consumed in the slaking reaction. As the comminuting apparatus 50 comminutes the quick lime to a very fine powder having a large surface area. Then the water W1 mixed to the powder by the comminuting apparatus 50 causes the slaking reaction to start very quickly which raises the temperature very fast. This rising temperature further accelerates the slaking reaction. As it is a practical fact that the consumption speed of the water fed into the comminuting apparatus 50 depends on the quality of the quick lime, mostly on its reactivity, the volume of water W1 fed in order to maximize the rising speed of the temperature must be dosed according to the reactivity of the quick lime. In other words, it is not worth feeding more water to the comminuting apparatus 50 than is consumed in the slaking reaction as heating of the excess water consumes energy and decelerates the rise of the temperature. A practical rule of thumb could be to feed one third of the water required slaking water to the comminuting apparatus 50 and the rest to the screw 52 forming the second part of the slaking apparatus, into which slaking liquid W2 is introduced in one or several stages for slaking the quick lime and thus converting the calcium oxide to calcium hydroxide. The feeding of the slaking water to the screw is preferably designed so that the viscosity of the slurry of calcium oxide and calcium hydroxide to be transferred with the screw remains within the range suitable for the purpose, in other words the slurry moves easily with the screw. The length of the screw 52 and the temperature of the liquid used for slaking are adapted so that the quick lime is slaked essentially completely in the transport screw 52. In other words, the slaking of quick lime is performed according to the invention in controlled conditions by starting the slaking in the comminuting apparatus and competing it in the transport screw or some other transfer device suitable for the purpose.

Subsequent to the transport/slaking screw 52, in case the liquid used for slaking has not diluted the milk of lime to a low enough dry solids content, the milk of lime is diluted with liquid DW and the milk of lime in sorting consistency is introduced, by means of a pump or without one, to the above-mentioned applicable sorting/sorter 54, by means of which large impurities are removed from the milk of lime. These impurities are also removed from the process, because they contain nearly solely material disadvantageous for the end product. Sometimes it is possible to arrange washing apparatuses to the reject line of sorting 54 (an alternative example is shown in more detail in connection with the embodiment of FIG. 7) by means of which usable material, i.e. calcium hydroxide, is recovered from the reject. Preferably this sorting stage 54 is brought into such a point of the process where the calcium hydroxide has not had the time to form particles at all, so practically all material removed from the process has at least unsuitable particle size for introduction into the paper making.

There are three alternatives for the further processing of the accept from the sorting 54, in practice milk of lime containing only finely comminuted calcium hydroxide. It may be directed to the production of PCC immediately subsequent to sorting 54 (either a separate PCC reactor or the approach system of the fibrous web machine), it may be pumped further towards the production of PCC, which thus can take place in a separate PCC reactor or in the approach system of the fibrous web machine, or it may be directed to a buffer tank or the like, the main purpose of which is to balance the deviations of production so that a steady flow of milk of lime to the production of PCC may be guaranteed. The buffer tank can naturally be utilized also during production standstills of both the fibrous web machine and lime slaking or after them in a suitable way. At best, the buffer tank only causes a delay of seconds in the transport of milk of lime from slaking to production of PCC. Thus, in optimal conditions it is possible to replace the buffer tank with e.g. a drop leg following the sorter 54. In both of the latter cases, however, prior to using the milk of lime for production of PCC the milk of lime is pumped to a cleaning apparatus 58, preferably to cyclone cleaning, by means of which any calcium hydroxide particles, having had time to form particles and being too large for the production of PCC, are separated from the milk of lime being introduced to the production of PCC into either the reactor or approach system of the fibrous web machine or pipeline. The oversize particles are fully usable material so they are returned to the feed of the comminuting apparatus 50 to be comminuted again. The above-mentioned cleaning step 58 can preferably comprise either a single cyclone cleaning apparatus, a number of cyclone cleaning apparatuses connected in parallel or cyclone cleaning apparatuses connected in series.

Figure 7:
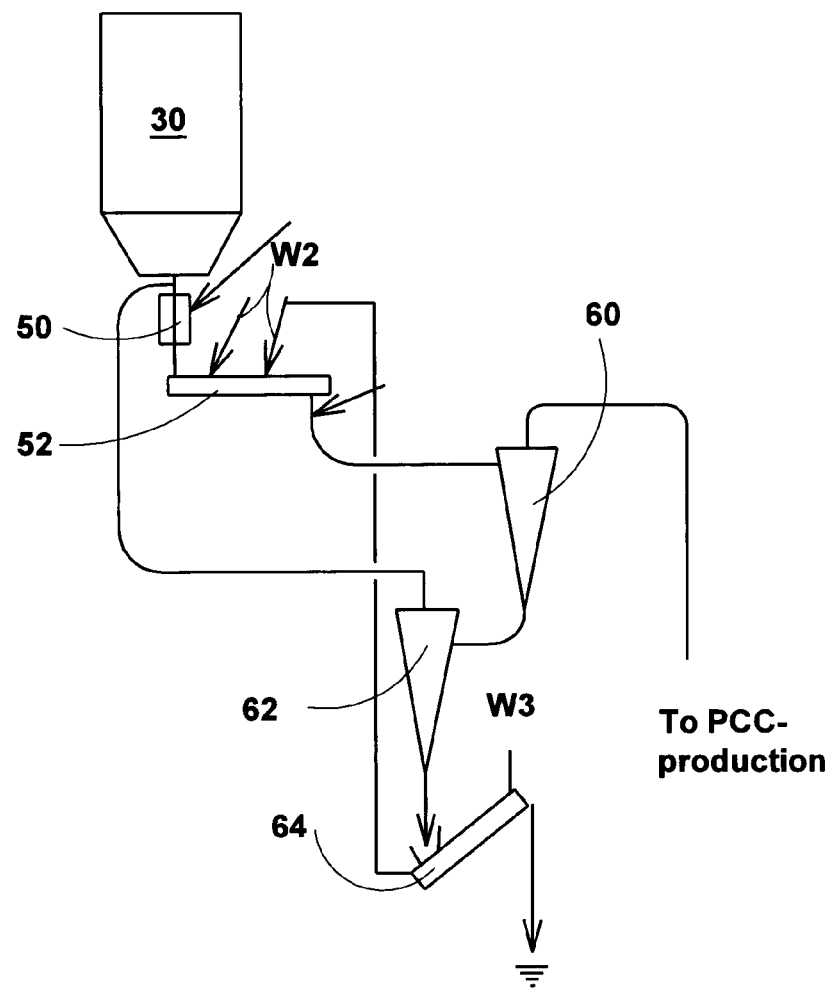
FIG. 7 is a schematic illustration of a method according to an advantageous embodiment of the present invention for cleaning the milk of lime prior to the in-line production of PCC.

FIG. 7 shows the sorting arrangement according to another preferred embodiment of the invention. In the arrangement the milk of lime discharged from the screw 52 is directed into a two-step cyclone cleaning, in which the accept from the first step 60 is immediately taken to the production of PCC and the reject containing material too coarse for the production of PCC is introduced into the second cyclone cleaning step 62. The accept from the second cyclone cleaning step 62, containing practically only calcium hydroxide agglomerates, is returned to the feed of the comminuting apparatus 50, and the reject, containing nearly only waste rock and other material not suitable for the process, is directed to the washing screw 64. Also liquid W3 needed in counter-current wash is fed to the washing screw 64, which flushes from the reject calcium hydroxide particle possible present in the reject, and the particles are taken with washing water W3 to the slaking of quick lime, for example to the screw 52. Of course, it is possible to take liquid W3 to serve as quick lime slaking water also in the comminuting apparatus 50. Waste rock and other materials not suitable for the production of the end product are removed from the discharge end of the washing screw 64 as the reject of the process. From the above description it should be noticed that both cyclone cleaning steps 60, 62 may comprise one or more cyclone cleaning apparatuses. It is further possible to provide more cleaning steps than the two steps described above. Similarly, the washing treatment of the reject of the last (second in this embodiment) cleaning step is not necessary for the invention.

In addition to the fact that the use of the comminuting apparatus 50 described in the first embodiment of the invention makes the slaking faster by comminuting the quick lime particles into a fine powder prior to slaking is also that it characteristically more easily breaks down the relatively soft limestone particles into a usable size than the harder stone material (such as quartz) or sintered calcium oxide particles, whereby the impurities remaining coarser may be removed from the process in sorting 54. The limestone particles are namely formed in the burning of the lime, in which calcium carbonate is heated to a temperature of 900 to 1200 degrees, the purpose being to break the calcium carbonate down to calcium oxide and carbon dioxide. In the burning, a portion of the calcium carbonate always remains in carbonate form without being converted to calcium oxide. This calcium carbonate is, however, fully usable as filler for paper as long as it is comminuted to an applicable particle size. The comminuting apparatus 50 used in the invention is capable of doing this, so the limestone i.e. calcium carbonate it has comminuted passes (in the process of FIG. 6) both the sorting 54 and the cleaning 58 and it is entrained as filler material in the end product. Thus the method and apparatus according to the invention improve the utilization rate of the material resulting from the burning of lime without rejecting any applicable material.

Further, the use of a screen-type apparatus instead of the cyclone cleaning steps 36 and 58 shown above in various embodiments for removing impurities from milk of lime, i.e. calcium hydroxide suspension, may be mentioned as an additional embodiment of the present invention. Such a screen-type apparatus may be a vibrating screen, a curved screen, a sorter or a pressure sorter, to mention only a few examples. Corresponding apparatuses are naturally also suitable for use as the sorter 54 of the embodiment of the invention shown in connection with FIG. 6 above.

As the process liquid for carrying out the slaking of the lime in the embodiments of FIGS. 5 to 7 or for carrying out the washing of the reject of the last step of cleaning the milk of lime in the embodiment of FIG. 7 mill water may, as is conventional, be used in the present invention, mill water here meaning raw water cleaned with various methods or cleaned mill filtrates. It is, however, characteristic for one version of the inventive method that in the invention also some non-clean water may be used for slaking the lime, thus avoiding unnecessary cleaning of water or even using raw water. In other words, the process liquid may be super clear, clear or cloudy filtrate, white water, filtrate from process waste waters, washing filtrate from bleaching, filtrate from a press, or head box stock or undiluted fiber suspension.

Additionally, in order to carry the slaking out as quickly as possible, it is advantageous for all embodiments of the invention to use liquid in a suitably high temperature for the slaking and/or a high dry solids concentration in the slaking Preferably the temperature of the liquid should in the above-described embodiments of the invention be in the range of 30 to 60° C. and/or the dry solids concentration should be over 30% to achieve a slaking temperature in the range of over 80 degrees, preferably over 90 degrees, more preferably near 100° C., or even over that, whereby the slaking of quick lime takes place most efficiently. For example, if the burnt lime is very pure, slaking water of 35 degrees is able to raise the slaking temperature of the quick lime at the dry solids content of 17% to about 100 degrees. In practice the efficient and thus also fast slaking of quick lime may be verified in that the end result is a high-quality milk of lime, the particle shape and size of which are optimal for e.g. production of PCC. Thus, for total economy the best alternative for slaking water is a hot liquid received directly from the process, in process temperature. Liquid, whether it is mill water or liquid taken as such from the process, may also be further heated by means of heating apparatuses suitable for the purpose using e.g. the secondary heat from the process. Various process filtrates may be mentioned as usable liquid alternatives: super clear, clear or cloudy filtrate, white water, filtrate from the effluent waters of the process, washing filtrate from bleaching, press filtrate and so on as well as headbox stock and undiluted pulp up to a consistency of 5%.

When working according to the process diagram of FIG. 6 it is possible to carry out the production of PCC starting from the discharge of lime from the hopper 30 in FIG. 6 to the comminuting apparatus 50 until the essentially full conversion to PCC in the headbox approach system pipe takes place at point 46 preferably in less than two minutes, more preferably in less than a minute, at its best in about 30 seconds. The speed of the process is naturally based on the fast comminuting of quick lime to small particles that are quickly (preferably in less than 10 seconds, more preferably in less than 5 seconds) slaked in the screw, especially when the water used for the slaking is as hot as possible and which form calcium hydroxide particles of such shape and size that they react quickly in the production of PCC.

In a test we have performed the average particle size of the milk of lime produced according to the invention, measured with the sedimentation technology-based SediGraph method is 1.0 μm or less, viscosity (at a solids content of about 15%) about 500 mPas or more and the screen residue (particles over 100 μm in diameter) less than 0.1%.

Figure 8:
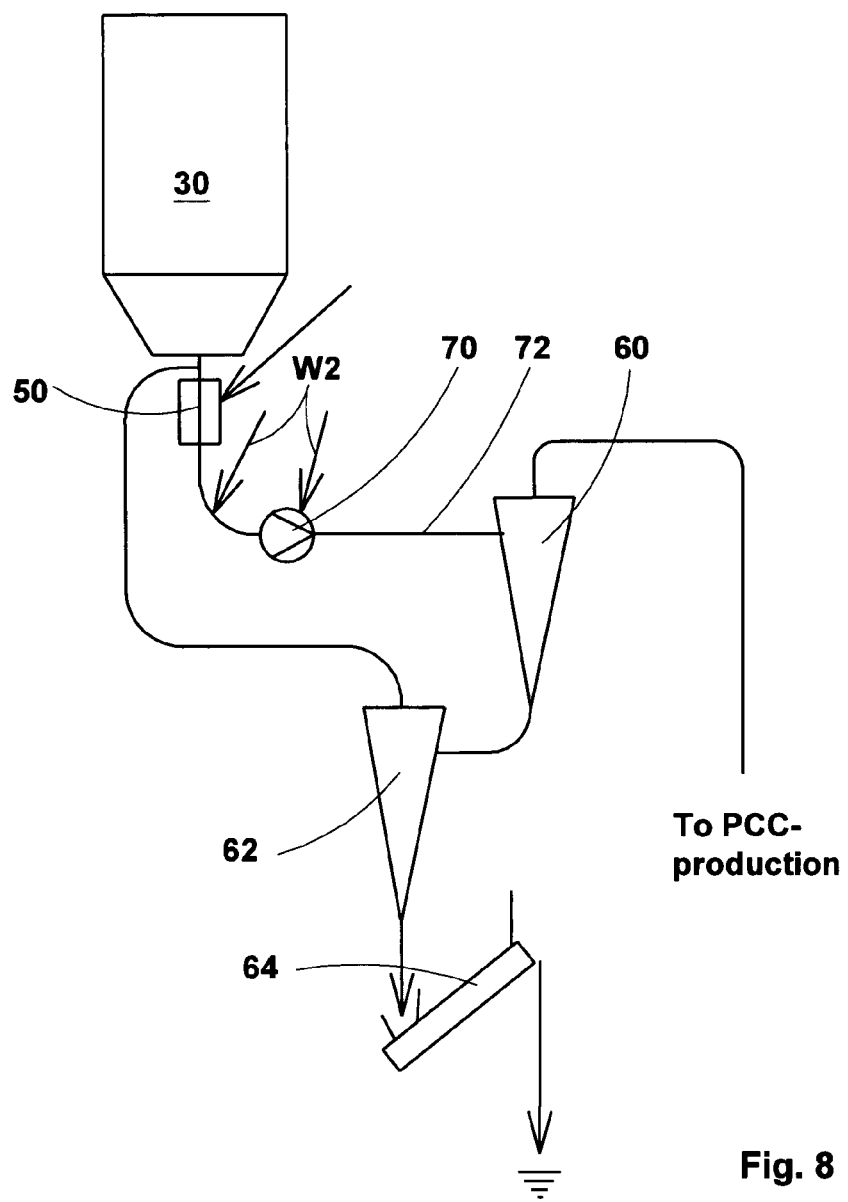
FIG. 8 is a schematical illustration of an apparatus according to another advantageous embodiment of the present invention for in-line production and cleaning of milk of lime.

According to an advantageous second embodiment of the invention, shown in FIG. 8, the transport/slaking screw 52, more broadly considered a displacement pump, forming the second part of the slaking apparatus and located subsequent to comminuting apparatus 50 in FIG. 6, may be replaced by a dynamic pump 70 and a pressure pipe 72 following it. In this case the main alternatives are various centrifugal pumps, without excluding, however, other dynamic pumps, either. As advantageous examples of pumps suitable for the purpose Discflo-type pumps may be mentioned, in which the pumping is carried out by a disc rotor rotating at a high speed, and conventional centrifugal pumps.

The disc rotor pump 70 of Discflo-type is capable of pumping comminuted lime further from the comminuting apparatus 50, the lime being already partly slaked in the apparatus, in high dry solids consistency. The disc rotor pump 70 also develops pressure so that the temperature in the pressure pipe 72 subsequent to the pressure conduit of the pump may be over 100 degrees, even over 150 degrees, resulting in the advantage that the lime is slaked very quickly and the formed milk of lime is very small in its particle size. As with the screw of FIG. 6, with the Discflo pump 70 liquid W2 needed for the slaking is introduced into the comminuted lime in at least one, preferably more of the following points: before the pump, in the pump, and after the pump, the same characteristics with the exception of temperature applying in this embodiment for the liquid W2 as for the slaking liquid of previous embodiments. As with the transport/slaking screw, it is advantageous for the slaking of lime if the liquid introduced in connection with the pumping is hot enough (in this embodiment the temperature may be even 80 to 95 degrees due to the pressurizing effect of the pump) so that the slaking speed of the lime is maximized when the temperature of the slaking period increases to over a hundred degrees in the pressure pipe 72 of the pump 70. The dilution of milk of lime to sorting consistency takes place in due course after the actual slaking reaction or in its final stage.

A conventional centrifugal pump may also be used for further transporting the comminuted and partly slaked lime arriving from the comminuting apparatus. However, due to the operation principle of the centrifugal pump, i.e. the necessary low consistency of the pumped material, the flow of comminuted lime from the comminuting apparatus must be mixed with the slaking liquid so that the dry solids content of the suspension is a few percent (preferably of the order of 2 to 6%). When the purpose is to quickly slake the lime and to produce fine-particled milk of lime, the temperature of the liquid used for diluting should be as high as possible (preferably 80 to 95° C.). Because a centrifugal pump, like the Discflo pump, increases pressure, it is preferable to allow the temperature to rise to over 100 degrees, even to over 150 degrees, in the pressure pipe after the pressure conduit of the pump.

The dilution of the comminuted lime from the comminuting device to the pumping consistency of the centrifugal pump may be arranged either by carrying the dilution out in a suitable tank provided with a mixer for dispersing the any possible lime particles from the comminuting device into the dilution/slaking water before the pump. Another way of diluting the comminuted lime is to arrange the feed opening of the centrifugal pump to near the discharge opening of the comminuting apparatus so that when (preferably hot) diluting/slaking liquid is introduced into this point of the process, the centrifugal pump carries out the necessary dispersing and the actual slaking takes place in elevated pressure and higher temperature in the flow channel after the pressure conduit of the centrifugal pump. Such milk of lime slaked by means of a centrifugal pump may be directed either as such into sorting or it can be, if necessary, diluted to a lower dry solids content, whereby the amount of necessary dilution liquid is, however, lower than when using a disc rotor pump of the Discflo-type.

The above discussion concerns production of milk of lime from burnt lime. It is, however, also possible to produce milk of lime form hydrate as well, the hydrate being dry calcium hydroxide. It is, in other words, slaked lime, the water used for slaking being totally or nearly totally used in the slaking reaction. Production of milk of lime from hydrate is made by dissolving the hydrate in water to desired dry solids content and by introducing the thus formed milk of lime into the cyclone cleaning according to the invention, more generally immediately to the production of PCC in the approach pipeline of the fibrous web machine via sorting.

In the above the method of forming PCC into the approach pipeline of the fibrous web machine has not been discussed in detail. Preferably, but not necessarily, it is carried out as described in detail in publication WO-A2-2009103854. In short, most preferably the production of PCC is carried out by introducing both carbon dioxide and milk of lime into the approach system of the fibrous web machine, more specifically into its pipeline, apparatuses or tanks by using injection mixers (which can be considered as being referred to with reference numeral 38 and 40), by means of which both chemicals may be mixed practically evenly into the fibrous stock so that optimal conditions for the mutual reaction are formed. Thus the reaction proceeds very quickly within the length of the reaction zone shown by reference number 44 in FIGS. 5 and 6. FIGS. 5 and 6 also show a metering device with reference number 46 by means of which the progress of the reaction, in practice the ending of the reaction, may be verified. The metering device may be based on pH-measurement, or conductivity or tomography, for example, to mention only a few examples. In the pipeline of the approach system the injection mixers may be arranged, in addition to arranging cyclone cleaning on the upstream side as shown in the figures, also to the introduction of a fibrous pulp fraction before the mixing tank, between the cyclone cleaning and gas separation, between the gas separation and headbox screen or between the headbox screen and the headbox. Additionally, the chemicals (either one or both) may in some cases be introduced also to the tanks, pumps and/or mixers of the approach system.

It should be noted that only a few of the most preferred embodiments are disclosed above. Thus, it is obvious that the invention is not limited to the above-mentioned embodiments but it may be applied in many ways within the scope defined by the appended claims. The features disclosed in connection with various embodiments may also be used in connection with other embodiments within the inventive scope and/or different assemblies may be combined from the disclosed features, should it be desired and should it be technically feasible.

We claim:

1. A method for production of milk of lime in an in-line production process of precipitated calcium carbonate (PCC) arranged in connection with a fibrous web machine, the method comprising:
   comminutating quick lime in a comminuting apparatus which forms a first part of a slaking apparatus;
   feeding water to the comminuting apparatus to form a slurry of comminuted quick lime and water;
   feeding the slurry of the comminuted quick lime and the water to a second part of the slaking apparatus;
   adding water to the second part of the slaking apparatus;
   slaking the comminuted quick lime in the second part of the slaking apparatus at a temperature of at least 80 degrees Celsius to produce milk of lime;
   cleaning the milk of lime by separating oversize particles and agglomerates; wherein
      the second part of the slaking apparatus includes one of a displacement pump and a dynamic pump with a subsequent pressure pipe, whereby a retention time of the comminuted quick lime in one of the displacement pump and the dynamic pump with the subsequent pressure pipe corresponds a time for the slaking of the comminuted quick lime,
      feeding the milk of lime produced from one of the displacement pump and the dynamic pump with the subsequent pressure pipe to a cleaning step,
      in the cleaning step, removing oversize calcium hydroxide particles immediately prior to introducing the milk of lime to the in-line production process of PCC, and
      wherein the milk of lime is introduced into the in-line production process of PCC at a production line of the end or an intermediate product of a fibrous web machine.

2. The method according to claim 1, wherein the slaking of milk of lime is carried out in a pressurized volume.

3. The method according to claim 1 wherein in the screening step, impurities are removed from the milk of lime prior to removing of oversize calcium hydroxide particles from the milk of lime.

4. The method according to claim 1 wherein in the sorting step impurities are removed from the milk of lime together with the removal of calcium hydroxide agglomerates.

5. The method according to claim 1, wherein the displacement pump is a slaking screw, whereby
the slurry of comminuted quick lime and water is discharged from the comminuting apparatus to the slaking screw,
liquid used in the slaking is introduced to the slaking screw, and
slaked lime is discharged from the slaking screw.

6. The method according to claim 1, wherein:
the slurry of comminuted quick lime and water is discharged from the comminuting apparatus to the dynamic pump,
liquid for slaking the comminuted quick lime is fed to be in connection with the pump,
the pressure of the formed suspension is increased with the dynamic pump, and
the suspension is introduced from the dynamic pump to a pressure pipe, whereby the slaking of quick lime takes place in the volume subsequent to the dynamic pump in an increased pressure and a temperature.

7. The method according to claim 6, wherein the dynamic pump is a centrifugal pump, whereby
the slurry of comminuted quick lime and water is discharged from the comminuting apparatus to the centrifugal pump, and
liquid is added on the intake side of the pump into slurry of comminuted quick lime and water.

8. The method according to claim 1, wherein the water used for slaking is heated prior to being added to the comminuted quick lime.

9. The method according to claim 1, wherein:
the milk of lime is discharged into sorting from the slaking apparatus for separating impurities from the milk of lime,
the milk of lime is taken into a buffer tank,
the milk of lime is introduced into a cleaning apparatus for removing particles of calcium hydroxide from the milk of lime, and
the milk of lime is introduced into the approach system of the fibrous web machine.

10. The method according to claim 9, wherein calcium hydroxide particles are recycled to the feed of the comminuting apparatus.

11. The method according to claim 1, wherein the cleaning step is performed using a cyclone cleaning plant with at least two steps, and in the first step of which the comminuted milk of lime is separated from waste rock, and introducing calcium hydroxide agglomerates in the second step, wherein the calcium hydroxide agglomerates are returned to the feed of the comminuting apparatus.

12. The method according to claim 1, wherein carbon dioxide is also introduced into the in-line production process of PCC and the carbon dioxide and milk of lime are allowed to react to produce precipitated calcium carbonate (PCC).

13. The method according to claim 12, wherein the carbon dioxide and the milk of the lime are introduced by one or more injection mixers.

14. The method according to claim 12, wherein the carbon dioxide and milk of lime are introduced into a pipeline of an approach system of the fibrous web machine.

15. A method to produce milk of lime for an in-line production of precipitated calcium carbonate (PCC) for a fibrous web machine, the method comprising:
comminutating quick lime;
slaking the quick lime by mixing the comminuted quick lime with water to form a milk of lime, wherein the slaking is performed by continuously moving the quick lime through at least one of a displacement pump and a dynamic pump with a subsequent pressure pipe at a temperature of at least 80 degrees Celsius, and
separating particles and agglomerates from the milk of lime while the milk of lime continuously flows from the slaking step towards the fibrous web machine.

* * * * *